(No Model.)
C. RICHARDSON.
SAW HANDLE.
No. 292,951. Patented Feb. 5, 1884.
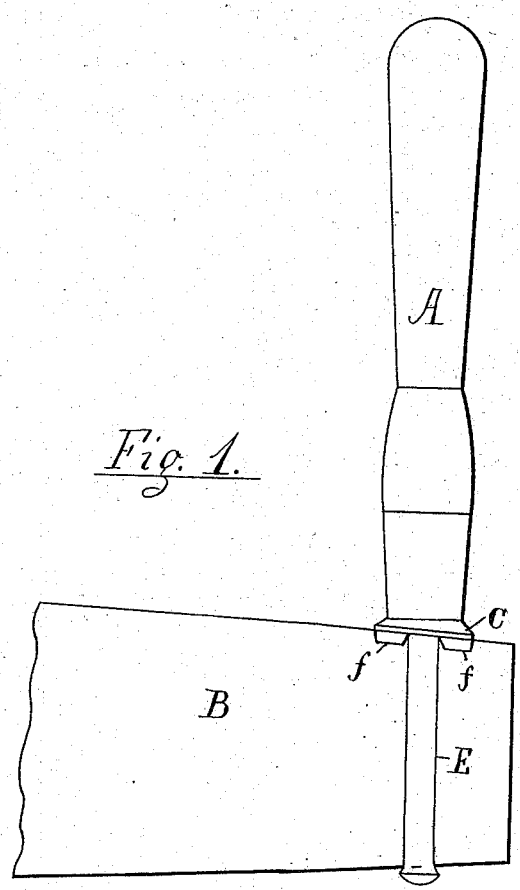
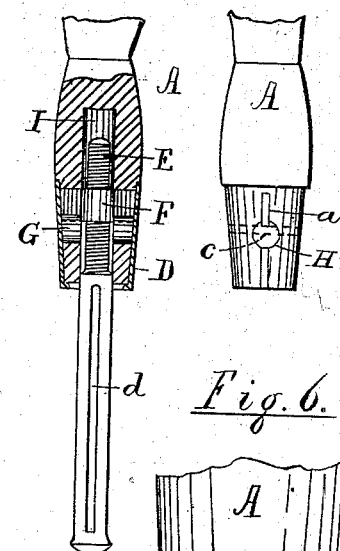
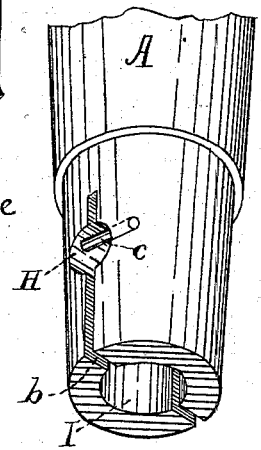
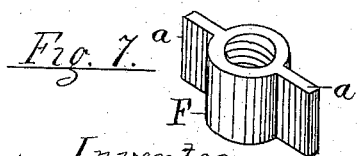
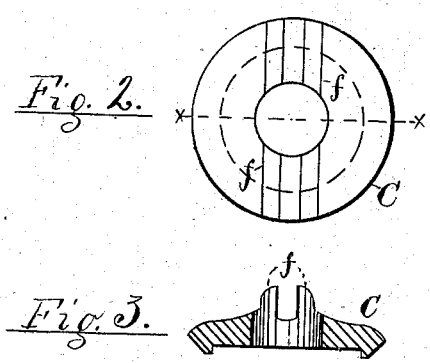
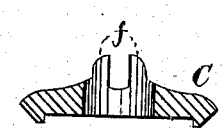
Attest.
H. Theberath
Henry N. Trevor
Inventor.
Chris. Richardson,
per Thos. S. Crane atty.

UNITED STATES PATENT OFFICE.

CHRISTOPHER RICHARDSON, OF NEWARK, NEW JERSEY.

SAW-HANDLE.

SPECIFICATION forming part of Letters Patent No. 292,951, dated February 5, 1884.

Application filed November 24, 1883. (No model.)

*To all whom it may concern:*

Be it known that I, CHRISTOPHER RICHARDSON, a citizen of the United States, residing in Newark, Essex county, State of New Jersey, have invented certain new and useful Improvements in Crosscut-Saw Handles, fully described and represented in the following specification and the accompanying drawings, forming a part of the same.

This invention consists in a special construction of the nut for the holding-bolt of the handle, and in the combination of the same with an appropriate handle and device for locking the nut therein.

In the drawings annexed, Figure 1 shows the handle A attached to such a saw-blade, B, a portion only of the blade being shown. Fig. 2 is a flat view of the collar C detached from the handle. Fig. 3 is a section of the collar across the center, as at $x$ $x$ in Fig. 2. Fig. 4 is a longitudinal section of the wooden part of the handle, showing the bolt and nut inside. Fig. 5 is a side view of the handle with the ferrule D removed, the view being taken at right angles to that shown in Fig. 4, and being the same side as is shown in Fig. 1. Fig. 6 is a perspective view of the lower end of the handle before the insertion of the nut; Fig. 7, a perspective view of the nut, and Fig. 8 a perspective view of the locking-plug. Figs. 2, 3, 6, 7, and 8 are drawn of the full size, and Figs. 1, 4, and 5 one-half the full size, of the handle.

A is the wooden handle; B, the saw-blade; C, the collar; D, the ferrule at the lower end of handle; E, the bolt; F, the nut; G, the locking-plugs for the nut, and H the seats in the handle for the same. The nut is cylindrical, and is fitted to a round hole, I, formed in the lower end of the handle as far as the bolt is to penetrate, and wings $a$ $a$ are formed on the nut as longitudinal ribs, adapted to enter a radial slot or saw-kerf, $b$, formed in each side of the handle parallel with the hole I. When the nut is forced into the hole I and slots formed by the kerfs $b$, its central tapped hole aligns with the center of the handle, and the thread formed on the bolt E penetrates the nut, so as to be drawn inward when the handle and nut are turned thereon.

To retain the nut in the hole I and slots $b$, a stop may be formed by inserting transverse pins through the handle, as indicated in dotted lines at $c$ $c$ in Figs. 5 and 6; but I prefer to use notched or plain plugs G, inserted in round holes or seats H radially beneath the wings. The plugs are shown as notched in Figs. 5 and 8, and consist in a round piece of metal fitted radially between the hole I and ferrule D, and formed with a longitudinal notch, $e$, to fit the lower edge of the wing $a$. The ferrule is applied to the lower end of the handle, as seen at D in Fig. 1 and in section in Fig. 4, after the nut and its stops are inserted in their seats, and the same are thus covered by the ferrule and effectually concealed and kept in place and the slotted end of the handle strengthened.

The collar shown in Figs. 1, 2, and 3 is always employed in some shape to fit between the saw-blade and the handle when clamped together by a central bolt, as shown herein; and my construction consists in forming the collar with lugs $f$ to steady and guide the saw-blade, and in making the notch $e$ between the lugs with an inclined bottom adapted to fit the particular saw-blade to which it is applied.

As the wings upon the nut F afford the means of applying various kinds of stops beside the plugs G or transverse pins $c$, it is obviously immaterial what sort of stop is combined with the wings, provided it locks the same into the handle for the purpose described.

The bolt E is shown herein as provided with a slot, $d$, for the reception of the saw-blade; but the bolt may be formed with an open hook at its lower end or otherwise, as the fitting of the bolt to the saw forms no part of this invention.

Having thus set forth the nature of my improvement, I do not claim a saw-handle having a nut and bolt inserted in a central hole merely, as that has been done before; but

I claim my improved construction in the following manner:

The combination, with the handle A, having the hole I and radial slots $b$, of the nut F, constructed with wings $a$, and the stops inserted in the handle beneath the wings to retain them in place, substantially as set forth.

In testimony whereof I have hereunto set my hand in the presence of two subscribing witnesses.

CHRISTOPHER RICHARDSON.

Witnesses:
THOS. S. CRANE,
A. VAN ARSDALE.